US012745241B2

(12) United States Patent
Reoganis et al.

(10) Patent No.: US 12,745,241 B2
(45) Date of Patent: Sep. 22, 2026

(54) OPTIMIZED UPLINK CONFIGURED GRANT ON NEW RADIO CARRIER AGGREGATION PRIMARY AND SECONDARY CELLS

(71) Applicant: T-MOBILE INNOVATIONS LLC, Overland Park, KS (US)

(72) Inventors: Liezel Asuncion Reoganis, Redmond, WA (US); Mochamad Mirza, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 392 days.

(21) Appl. No.: 18/367,846

(22) Filed: Sep. 13, 2023

(65) Prior Publication Data

US 2025/0089040 A1 Mar. 13, 2025

(51) Int. Cl.
*H04W 72/1268* (2023.01)
*H04L 5/14* (2006.01)

(52) U.S. Cl.
CPC ....... *H04W 72/1268* (2013.01); *H04L 5/1469* (2013.01)

(58) Field of Classification Search
CPC ... H04L 5/001; H04L 5/1469; H04W 72/1268
See application file for complete search history.

(56) References Cited

U.S. PATENT DOCUMENTS

2016/0112178 A1* 4/2016 Yi .......................... H04W 72/23 370/280
2019/0053319 A1* 2/2019 Jeon ..................... H04J 11/0076
2022/0095320 A1* 3/2022 Sakhnini ............. H04W 52/365

* cited by examiner

*Primary Examiner* — Kevin M Cunningham
(74) *Attorney, Agent, or Firm* — Shook, Hardy & Bacon L.L.P.

(57) ABSTRACT

Methods, systems, and a non-transitory computer-readable medium for optimizing uplink configured grants in a network. The method begins with establishing, by at least one user device, a network connection to a primary cell in a carrier aggregation network. The primary cell has a first multiplexing scheme with a first latency. Next, the method continues with configuring the uplink configured grant on a secondary cell in the carrier aggregation network. The secondary cell has a second multiplexing scheme with a second latency, the second latency lower than the first latency. The method then moves at least one traffic stream from the primary cell to the secondary cell, based on the second latency.

14 Claims, 5 Drawing Sheets

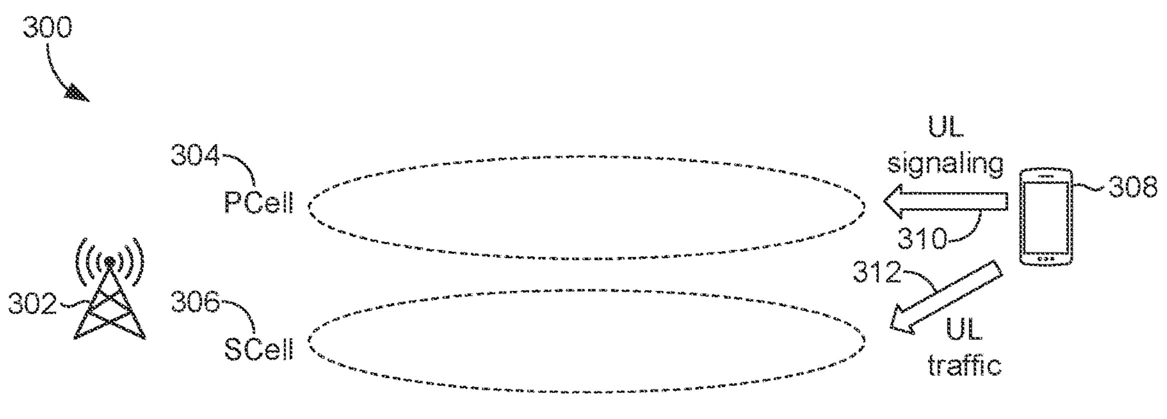
FIG. 3
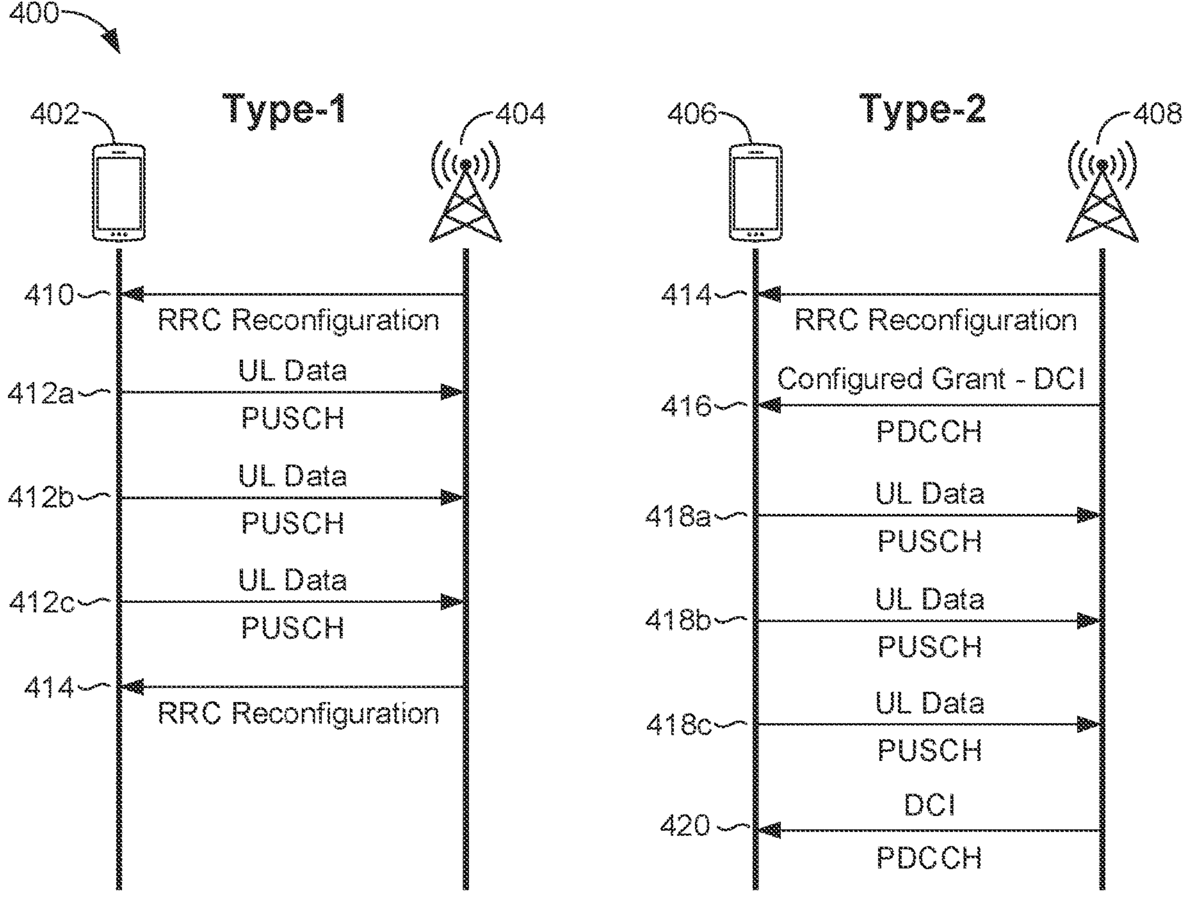
FIG. 4A
FIG. 4B

OPTIMIZED UPLINK CONFIGURED GRANT ON NEW RADIO CARRIER AGGREGATION PRIMARY AND SECONDARY CELLS

BACKGROUND

An uplink configured grant occurs in a wireless communication system when a user equipment (UE) transmits a scheduling packet to an access point without a scheduling request. The uplink configured grant may be standardized to reduce latency. In addition, the UE may also automatically transmit a predetermined number of repetitions without feedback from an access point. The uplink configured grant may be set to a minimum periodicity in a time division duplex (TDD) cell and a different minimum periodicity in a frequency division duplex (FDD) cell. However, the uplink configured grant is currently only configured on primary cells used in carrier aggregation and is not configured on secondary cells used in carrier aggregation. As a result, the periodicity that is used by the UE with TDD as a primary cell is not the lowest periodicity, even though the FDD secondary cell has a lower periodicity and periodicity and carrier aggregation is operating with both TDD and FDD new radio carrier aggregation (NRCA).

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods, systems, and a non-transitory computer-readable medium for optimizing uplink configured grants in a network. The method begins with establishing, by at least one user device, a network connection to a primary cell in a carrier aggregation network. The primary cell has a first multiplexing scheme with a first latency. Next, the method continues with configuring the uplink configured grant on a secondary cell in the carrier aggregation network. The secondary cell has a second multiplexing scheme with a second latency, the second latency lower than the first latency. The method then moves at least one traffic stream from the primary cell to the secondary cell, based on the second latency.

BRIEF DESCRIPTION OF THE SEVERAL VIEWS OF THE DRAWINGS

Implementations of the present disclosure are described in detail below with reference to the attached drawing figures, wherein:

FIG. 3 depicts optimized uplink configured grants on new radio carrier aggregation primary and secondary cells in an exemplary network environment in which implementations of the present disclosure may be employed, in accordance with aspects herein;

FIG. 4A is a call flow diagram of call flow using a radio resource control (RRC) protocol for optimizing uplink configured grants in new radio carrier aggregation (NRCA) primary and secondary cells, in accordance with aspects herein;

FIG. 4B is a call flow diagram of a call flow using a physical downlink control channel in a secondary cell for optimizing uplink configured grants in NRCA primary and secondary cells, in accordance with aspects herein;

DETAILED DESCRIPTION

Figure 1:
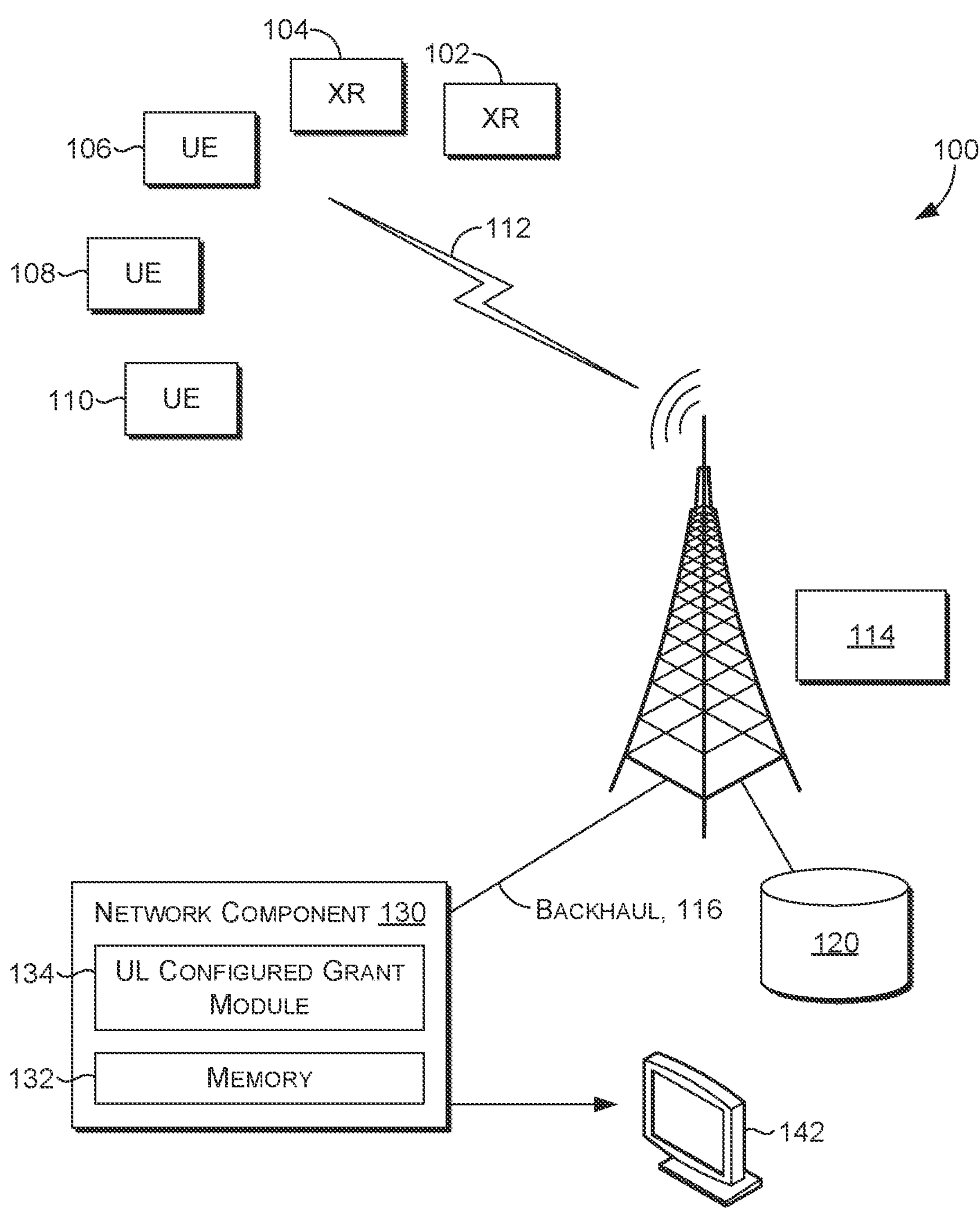
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A network may provide uplink configured grants for both primary and secondary cells in NRCA. When a user is active on a TDD and FDD NRCA network uplink configured grants may be enabled on the secondary cells. When this occurs, the primary cell may be used only for uplink NRCA signaling and the secondary cell is used for communication. The uplink configured grant may be enabled because in many operational situations, TDD is used on the primary cell and FDD is used on the secondary cell. This limits the periodicity to that of the FDD cell, which may be 1 ms. In contrast, the TDD periodicity may be 5 ms. Lower periodicity provides lower latency.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Further, various technical terms are used throughout this description. An illustrative resource that fleshes out various aspects of these terms can be found in Newton's Telecom Dictionary, $32^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., access point, node, cell sites, cell towers) to provide network coverage. The access points are employed to broadcast and transmit transmissions to user devices of the telecommunications network. An access point may be considered to be a portion of an access point that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, an access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency that is exclusive to that particular uplink connection (e.g., an LTE connection with an EnodeB). The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to device 600 described herein with respect to FIG. 6.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point or access point.

A first aspect of the present disclosure provides a method for optimizing uplink configured grants in a network. The method begins with establishing, by at least one user device, a network connection to a primary cell in a carrier aggregation network, the primary cell having a first multiplexing scheme with a first latency. Next, the method proceeds with configuring the uplink configured grant on a secondary cell in the carrier aggregation network. The secondary cell has a second latency that is lower than the first latency. The method concludes with moving at least one traffic stream from the primary cell to the secondary cell, based on the second latency.

A second aspect of the present disclosure provides a method for optimizing uplink configured grants in a network. The method begins with establishing, by a user device, a network connection to a primary cell in a carrier aggregation network, the primary cell having a first multiplexing scheme with a first latency. Then, the method continues with configuring, at the user device, the uplink configured grant on a secondary cell in the carrier aggregation network, the secondary cell having a second multiplexing scheme with a second latency. The second latency is lower than the first latency. The method concludes with receiving, at the user device, an instruction to move at least one traffic stream from the primary cell to the secondary cell based on the second latency.

Another aspect of the present disclosure is directed to a non-transitory computer storage media storing computer-usable instructions that cause the processors to establish a network connection to a primary cell in a carrier aggregation network, the primary cell having a first multiplexing scheme with a first latency. Next, the processors configure the uplink configured grant on a secondary cell in the carrier aggregation network, the secondary cell having a second multiplexing scheme with a second latency, wherein the second latency is lower than the first latency. Then the processors direct that at least one traffic stream be moved from the primary cell to the secondary cell, based on the second latency.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices (UE) 102, 104, 106, 108, and 110, access point 114 (which may be a cell site, access point, or the like), and one or more communication channels 112. The communication channels 112 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 1000) that communicates via wireless communications with the access point 114 in order to interact with a public or private network.

Figure 6:
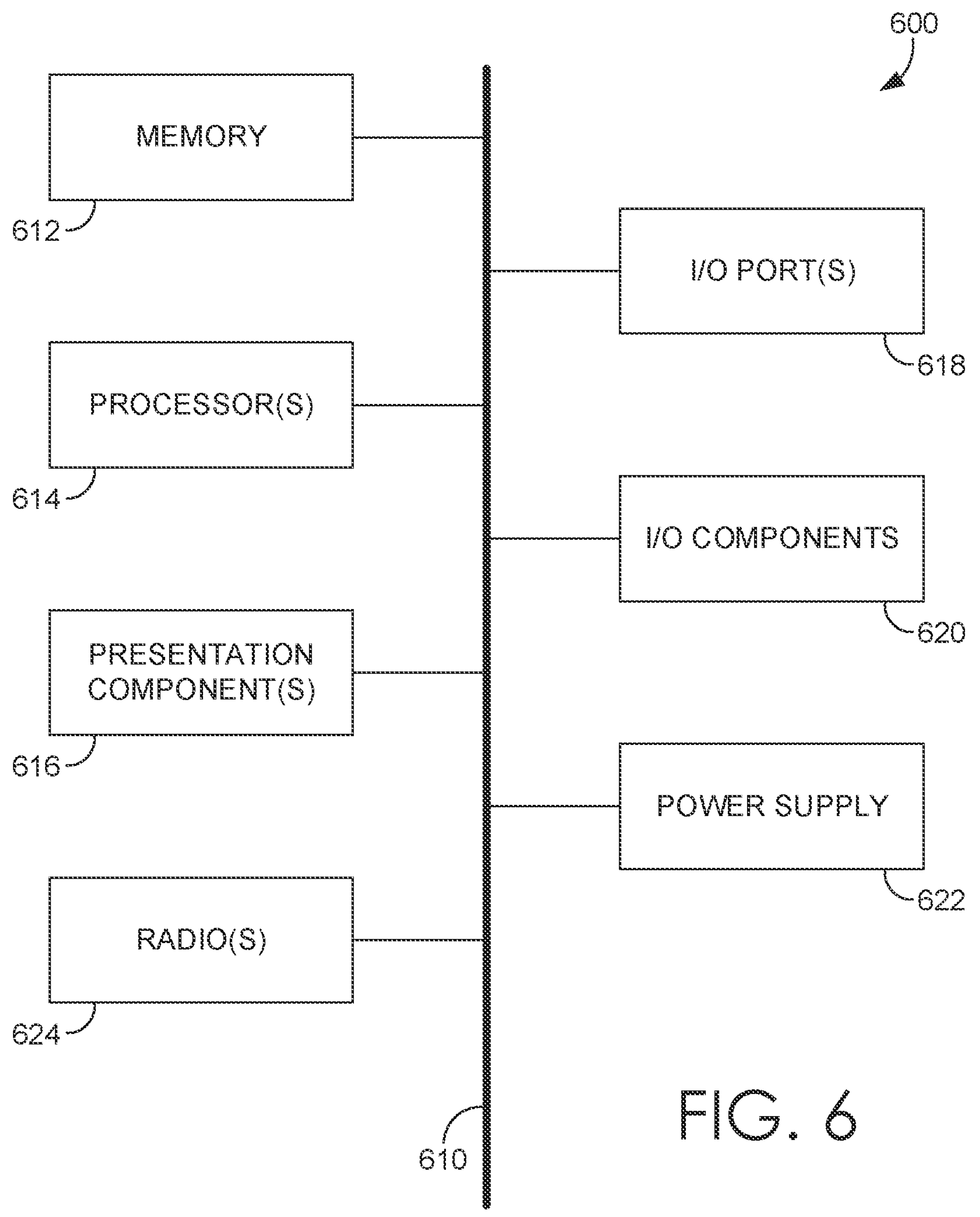
FIG. 6 depicts an exemplary computing device suitable for use in implementations of the present disclosure, in accordance with aspects herein.

In some aspects, each of the UEs 102, 104, 106, 108, and 110 may correspond to computing device 600 in FIG. 6. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE. CDMA, or any other type of network. In some cases. UEs 102, 104, 106, 108, and 110 in network environment 100 can optionally utilize one or more communication channels 112 to communicate with other computing devices (e.g., a mobile device(s), a server (s), a personal computer(s), etc.) through access point 114.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, access point 114 is configured to communicate with a UE, such as UEs 102, 104, 106, 108, and 110, that are located within the geographic area, or cell, covered by radio antennas of access point 114. Access point 114 may include one or more access points, base transmitter stations, radios, antennas, antenna arrays, power amplifiers, transmitters/receivers, digital signal processors, control electronics, GPS equipment, and the like.

As shown, access point 114 is in communication with a network component 130 and at least a network database 120 via a backhaul channel 116. As the UEs 102, 104, 106, 108, and 110 collect individual signal information, the signal information can be automatically communicated by each of the UEs 102, 104, 106, 108, and 110 to the access point 114. Access point 114 may store the signal information and data communicated by the UEs 102, 104, 106, 108, and 110 at a network database 120. Alternatively, the access point 114 may automatically retrieve the status data from the UEs 102, 104, 106, 108, and 110, and similarly store the data in the network database 120. The signal information and data may be communicated or retrieved and stored periodically within a predetermined time interval which may be in seconds, minutes, hours, days, months, years, and the like. The signal information and data may include information about uses and contexts of digital vision systems, including camera systems.

The network component 130 comprises a memory 132 and an UL configured grant module 134. All determinations, calculations, and data further generated by the UL configured grant module 134 may be stored at the memory 132 and also at the data store 120. Computer terminal 142 is in communication with the network component 130, and through network component 130, the UL configured grant module 134 and the memory 132. Although the network component 130 is shown as a single component comprising the memory 132 and UL configured grant module 134, it is also contemplated that each of the memory 132 and the UL configured grant module 134, may reside at different locations, be its own separate entity, and the like, within the home network carrier system.

The network component 130 is configured to retrieve NRCA data, such as a number and duration of primary and secondary cells used. The network component 130 can also track uplink and downlink activities and traffic. The UL configured grant module 134 can determine UL grant parameters for both primary and secondary cells in NRCA. The UL configured grant module 134 may be located in a central office or other centralized location. For a distributed radio access network, the memory 132 and the UL configured grant module 134 can be located at the access point 114.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through access point 114. For example, a carrier can have two frequency bands FR1 and FR2. FR1 can cover 4.1 GHz to 7.125 GHz and FR2 can cover 24.25 GHz to 52.6 GHz. A carrier, or mobile network operator, may consider carrier aggregation (CA), which allows use of multiple sub-6 GHz spectrum channels simultaneously. CA groups several frequency bands to provide higher peak rates and increased cell coverage. In addition, CA extends coverage and increases network capacity. To further increase network performance, frequency division duplex (FDD) and/or time division duplex (TDD) carrier aggregation can be implemented.

FDD and TDD are two different spectrum usage techniques. While FDD uses separate frequencies for uplink and downlink communication, TDD uses a single frequency for both uplink and downlink, with devices transmitting a different times. TDD can be more suitable when paired spectrum resources are not available. In general, FDD can provide better coverage, while TDD can provide better capacity.

Figure 2:
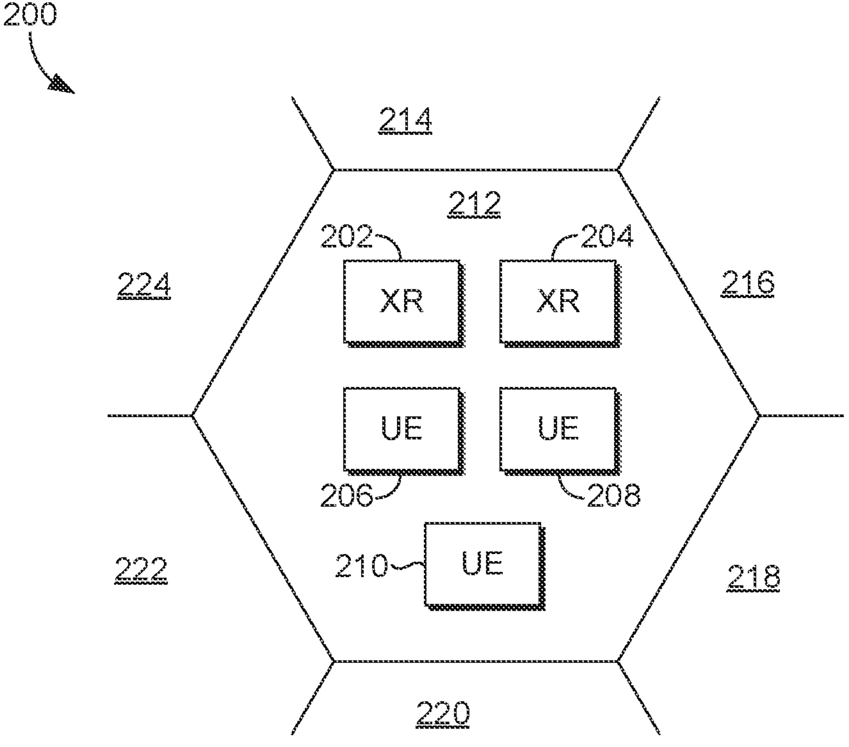
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, 224, each including access point 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210 may be located within geographic area 200 collecting UE data that is useable by network component 130, in accordance with aspects herein. UEs 202, 204, 206, 208, and 210 can move within the cell currently occupied, such as cell site 212 and can move to other cells such as adjoining cell sites 214, 216, 218, 220, 222 and 224.

FIG. 3 depicts optimized uplink configured grants on new radio carrier aggregation primary and secondary cells in an exemplary network environment in which implementations of the present disclosure may be employed. The network 300 includes an access point 302 having a primary cell 304 and a secondary cell 306. The access point 302 may be a dual connectivity access point. A primary cell 304 may be used to initiate initial access to a cell site. The primary cell 304 may be combined with a secondary cell 306 using carrier aggregation. Both the primary cell 304 and the secondary cell 306 may be in communication with a UE 308. The UE 308 may communicate with the primary cell 304 using UL signaling 310 and may communicate with the secondary cell 306 using UL traffic 312.

FIG. 4A is a call flow diagram of call flow using a radio resource control (RRC) protocol for optimizing uplink configured grants in new radio carrier aggregation (NRCA) primary and secondary cells, in accordance with aspects herein. A network 400 may provide two call flows of activation/deactivation of uplink configured grants and a secondary cell. Each call flow achieves uplink configured grant secondary cell activation/deactivation, however, a first call flow uses a radio resource control (RRC) protocol and the second call flow uses a secondary cell physical downlink control channel (PDCCH). The first call flow uses the RRC protocol and begins with an access point 404 sending a first RRC reconfiguration message 410 for uplink grant scheduling configuration. The first RRC reconfiguration message may be sent in response to the user device 402 joining the network or requesting to transmit uplink data to the network. The user device 402 responds with uplink data flows 412*a*, 412*b*, and 412*c* which may be sent over a physical uplink shared channel (PUSCH). After receiving the uplink data flows 412*a*, 412*b*, and 412*c*, the access point 404 responds with a second RRC reconfiguration message 414 that is configured for a secondary cell instead of a primary cell. Both activation and deactivation of the secondary cell is done via the RRC reconfiguration messages. The uplink data sent on the PUSCH may then be sent to the secondary cell.

FIG. 4B is a call flow diagram of a call flow using a physical downlink control channel in a secondary cell for optimizing uplink configured grants in NRCA primary and secondary cells, in accordance with aspects herein. The second call flow begins with an access point 408 sending a RRC reconfiguration message 414 to a user device 406. The RRC reconfiguration message may be sent in response to the user device 406 joining the network or requesting to transmit uplink data to the network. The access point 408 also sends a PDCCH downlink control information (DCI) message 416 with an uplink configured grant scheduling activation message over a physical downlink control channel (PDCCH). The user device 406 responds with uplink data that may be sent over a PUSCH in uplink data flows 418*a*, 418*b*, and 418*c*. The access point 408 then responds with a DCI message 420 over the PDCCH channel. At this point, the PUSCH data will be sent to the secondary cell.

Figure 5:
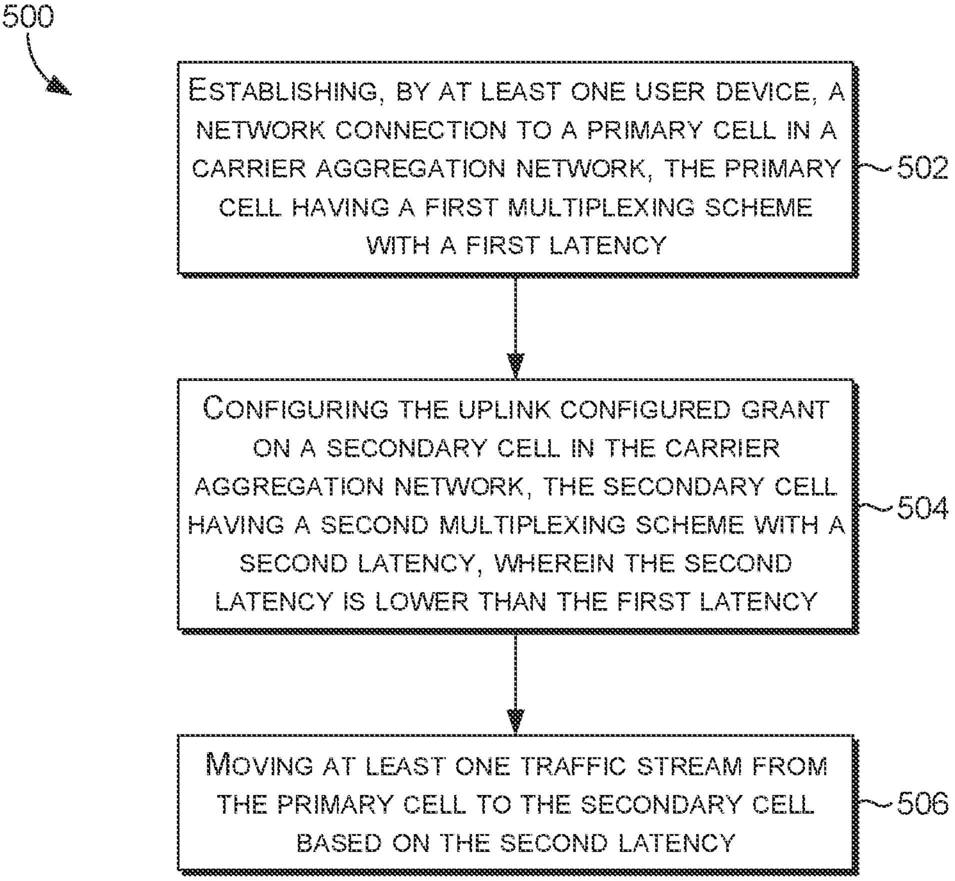
FIG. 5 is a flow diagram of a method for optimizing uplink configured grants in new radio carrier aggregation primary and secondary cells, in accordance with aspects herein.

FIG. 5 is a flow diagram of a method for optimizing uplink configured grants in new radio carrier aggregation primary and secondary cells, in accordance with aspects herein. The method 500 begins in step 502 with establishing, by at least one user device, a network connection to a primary cell in a carrier aggregation network, the primary cell having a first multiplexing scheme with a first latency. The method then continues in step 504 with configuring the uplink configured grant on a secondary cell in the carrier aggregation network, the secondary cell having a second multiplexing scheme with a second latency, wherein the second latency is lower than the first latency. The method then concludes in step 506 with moving at least one traffic stream from the primary cell to the secondary cell, based on the second latency.

After moving the at least one traffic stream to the secondary cell the uplink signaling is transmitted on the primary cell and the data flowing to the user device does so via the secondary cell. The first multiplexing scheme may be a TDD multiplexing scheme and the second multiplexing scheme may be a FDD multiplexing scheme. The latency of the TDD multiplexing scheme may be 5 milliseconds and the latency of the second multiplexing scheme may be 1 millisecond. The primary and secondary cells may be used in a carrier aggregation network that is a NRCA network.

FIG. 6 depicts an exemplary computing device suitable for use in implementations of the present disclosure, in accordance with aspects herein. With continued reference to FIG. 6, computing device 600 includes bus 610 that directly or indirectly couples the following devices: memory 612, one or more processors 614, one or more presentation components 616, input/output (I/O) ports 618, I/O components 620, radio(s) 624, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation." "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 606 that read data from various entities such as bus 610, memory 612 or 1/O components 620. One or more presentation components 616 present data indications to a person or other device. Exemplary one or more presentation components 616 include a display device, speaker, printing component, vibrating component, etc. V/O ports 618 allow computing device 600 to be logically coupled to other devices including/O components 620, some of which may be built into computing device 600. Illustrative I/O components 620 include a microphone, joystick, game pad, satellite dish, scanner, printer, wireless device, etc.

The radio(s) 624 represents one or more radios that facilitate communication with a wireless telecommunications network. While a single radio 624 is shown in FIG. 6, it is contemplated that there may be more than one radio 624 coupled to the bus 610. Illustrative wireless telecommunications technologies include CDMA, GPRS, TDMA, GSM, and the like. The radio 624 may additionally or alternatively facilitate other types of wireless communications including Wi-Fi, WiMAX, LTE, 3G, 4G, LTE, 5G. NR, VoLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for optimizing uplink configured grants in a network, the method comprising:

establishing, by at least one user device, a network connection to a primary cell in a carrier aggregation network, the primary cell having a first multiplexing scheme with a first latency;

configuring the uplink configured grant on a secondary cell in the carrier aggregation network, the secondary cell having a second multiplexing scheme with a second latency, wherein the second latency is lower than the first latency; and moving at least one traffic stream from the primary cell to the secondary cell based on the second latency being lower than the first latency, wherein after moving the at least one traffic stream, the primary cell carries only uplink signaling traffic and the secondary cell carries uplink data traffic via the uplink configured grant, and wherein no data traffic is transmitted on the primary cell.

2. The method of claim 1, wherein the first multiplexing scheme is a time division duplex multiplexing scheme.

3. The method of claim 1, wherein the second multiplexing scheme is a frequency division duplex multiplexing scheme.

4. The method of claim 1, wherein the first latency is 5 milliseconds.

5. The method of claim 1, wherein the second latency is 1 millisecond.

6. The method of claim 1, wherein the carrier aggregation network is a new radio carrier aggregation (NRCA) network.

7. A method for optimizing uplink configured grants in a network, the method comprising:

establishing, by a user device, a network connection to a primary cell in a carrier aggregation network, the primary cell having a first multiplexing scheme with a first latency;

configuring, at the user device, the uplink configured grant on a secondary cell in the carrier aggregation network, the secondary cell having a second multiplexing scheme with a second latency, wherein the second latency is lower than the first latency; and receiving, at the user device, an instruction to move at least one traffic stream from the primary cell to the secondary cell based on the second latency being lower than the first latency, wherein after moving the at least one traffic stream in response to the instruction, the primary cell carries only uplink signaling traffic and the secondary cell carries uplink data traffic via the uplink configured grant, and wherein no data traffic is transmitted on the primary cell.

8. The method of claim 7, wherein the first multiplexing scheme is a time division multiplexing scheme.

9. The method of claim 7, wherein the second multiplexing scheme is a frequency division duplex multiplexing scheme.

10. A non-transitory computer storage media storing computer-usable instructions that, when used by one or more processors, cause the processor to:

establish a network connection to a primary cell in a carrier aggregation network, the primary cell having a first multiplexing scheme with a first latency;

configure the uplink configured grant on a secondary cell in the carrier aggregation network, the secondary cell having a second multiplexing scheme with a second latency, wherein the second latency is lower than the first latency; and move at least one traffic stream from the primary cell to the secondary cell based on the second latency being lower than the first latency, wherein after moving the at least one traffic stream, the primary cell carries only uplink signaling traffic and the secondary cell carries uplink data traffic via the uplink configured grant, and wherein no data traffic is transmitted on the primary cell.

11. The non-transitory computer storage media of claim 10, wherein the first multiplexing scheme is a time division duplex multiplexing scheme.

12. The non-transitory computer storage media of claim 10, wherein the second multiplexing scheme is a frequency division duplex multiplexing scheme.

13. The non-transitory computer storage media of claim 10, wherein the first latency is 5 milliseconds.

14. The non-transitory computer storage media of claim 10, wherein the second latency is 1 millisecond.

* * * * *